3,413,372
PROCESS FOR THE SYNTHESIS OF MESITYLENE
Edward Hurley, Jr., Littleton, Colo., assignor to Marathon Oil Company, Findlay, Ohio, a corporation of Ohio
No Drawing. Filed Sept. 29, 1966, Ser. No. 583,071
9 Claims. (Cl. 260—668)

ABSTRACT OF THE DISCLOSURE

The present invention comprises processes for the synthesis of mesitylene from acetone comprising heating acetone in the conjoint presence of a catalytic amount of an acid and an aprotic solvent.

---

The present invention relates to a novel synthesis of mesitylene from acetone in the presence of an acid catalyst and an aprotic solvent. The importance of this invention is the achievement of extremely high selectivities of acetone for the production of large amounts of mesitylene and small amounts of mesityl oxide, wherein the mesityl oxide therein produced is recycled to react with acetone to produce more mesitylene. Selectivities of these desirable products as high as 0.99 can be achieved with the process, which obviates the formation of undesirable heavy aldol condensation type by-products and presents an improved economic situation with respect to the production of tri-alkylbenzenes.

By "aprotic solvents" is meant compositions which are liquid under the conditions of the reaction, which have a high dielectric constant (greater than 15 at 25° C.) which are dipolar. That is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to catalyst anions in solution in the reaction mixture. The aprotic solvent can be composed of a mixture of liquids so long as the overall liquid compositions meet the above criteria. The preferred aprotic solvents consist of N-alkyl pyrrolidones, dialkyl formamides, and dialkylamides, especially those in which the alkyl group are methyl groups. The most preferred solvent for the reaction in this invention is N-methyl pyrrolidone. These amides have base dissociation constants ($K_b$) that range from $10^{-10}$ to about $10^{-18}$ but preferably in the range $10^{-12}$ to $10^{-16}$. The preferred amount of the aprotic solvent is 3 to 4 fold excess of solvent to acetone.

Any acid capable of supplying hydrogen ions will serve as an acid catalyst. Suitable acids for the process comprise hydrochloric, sulfuric, and acetic, with hydrochloric being the preferred acid. The process is successful for a wide range of acid concentrations. The acid catalyst can be present in amounts of from about 0.05 to about 0.5 mole, but the preferred amount is from about 0.15 to about 0.25 mole per mole of ketone. The optimum amount of acid is 0.23 mole per mole of ketone.

The process is operable in a temperature range of from about 50° to about 200° C. with a preferred temperature being in the range from about 150° to about 200° C. The temperature limitations are in consideration that the process operates at atmospheric pressures. At pressures greater than atmospheric, the temperature range could be significantly increased.

Although the invention is not to be restricted to any particular theory, the process can probably be exemplified by the typical reaction:

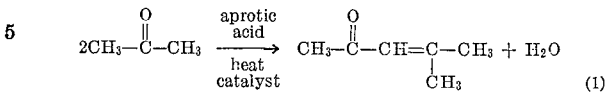

(1)

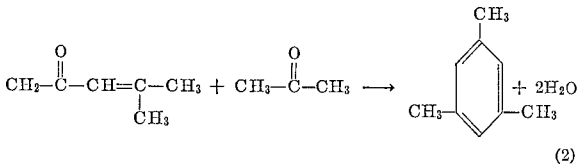

(2)

Thus, acetone is heated in the presence of a catalyst and aprotic solvent to produce the intermediate mesityl oxide, which combines with more acetone to form mesitylene. In the prior art undesirable by-products are formed (U.S. 2,419,142) such as isophorone and isobutylene which necessitate additional separation steps. If the condensation of acetone is carried out in the presence of sulfuric acid, a range of by-products are formed such as durene, 5,1,2,3—$CH_3CC_6H_4Me_3$, $C_6CH_3$, $C_{14}H_{20}$, and $C_8H_{16}SO_3$ (Landa et al., Chem. Listy (1957) 51, 1159–1164), which impairs the commercial aspects of mesitylene production. I have discovered that the proper selection of an acid catalyst with combination of an appropriate aprotic solvent eliminates the undesirable by-products and produces mesitylene and a small amount of mesityl oxide from acetone with selectivities as high as 0.99. My invention involves a process that produces relatively pure mesitylene without significant amounts of undesirable by-products in a one-step operation.

The following examples are illustrative of the practice of my invention.

EXAMPLE I

To 31 g. of N-methylpyrrolidone (NMP) were added 0.23 mole HCl and 1.0 mole acetone. The reaction mixture was heated at 200° C. for 8.0 hours in a Fischer-Porter tube. Aliquots were removed from the sample tube and analysis by gas chromatography indicated that 39% of the acetone had been converted. The yield of mesitylene was 31% with a selectivity of 0.99 to mesitylene and mesityl oxide.

EXAMPLE II

The same experiment as Example I was carried out but 0.08 mole HCl was employed. Results indicated that the 35% of the acetone was converted with a yield of 13% mesitylene and 6% mesityl oxide producing a selectivity of 0.53 to mesitylene and mesityl oxide. This experiment showed that a decrease in the amount of acid catalyst reduced the selectivity of acetone to mesitylene.

EXAMPLE III

To 31 g. of NMP were added 0.27 mole $H_2SO_4$ and 1.0 mole acetone. The reaction mixture was heated at 200° C. for 8.0 hours in a Fischer-Porter tube. The results showed that 18% of the acetone was converted to yield 4% mesitylene and 10% mesityl oxide with a selectivity of 0.52. This experiment indicated that HCl is a better catalyst than $H_2SO_4$.

What is claimed is:
1. The process for the synthesis of mesitylene from acetone comprising heating acetone to a range of from about 50 to about 200° C. in the conjoint presence of from 0.05 to about 0.5 mole of an acid capable of supplying hydrogen ions per mole of ketone and of an aprotic solvent which is liquid under the conditions of the reaction, has a dielectric constant greater than 15 at 25° C. and which is dipolar so that one part of the molecule has a more positive electrical charge relative to the other parts of the molecule causing the molecule to act as a dipole, is sufficiently inert not to enter into deleterious side reactions to a significant degree under the reaction conditions, and which does not possess hydrogen atoms capable of hydrogen bonding with or transferring to catalyst ions in solution in the reaction mixture.

2. The process of claim 1 wherein the aprotic solvent is selected from the group consisting of N-alkyl pyrrolidones, dialkylamides, dialkyl sulfoxide, nitrobenzenes, and acetonitrile and its alkyl derivatives.

3. The process of claim 2 wherein the N-alkyl pyrrolidones are selected from the amides N-methyl-2-pyrrolidone, and N-ethyl-2-pyrrolidone.

4. The process of claim 2 wherein the base constants ($K_b$) of aprotic solvents range from about $10^{-10}$ to about $10^{-18}$.

5. The process of claim 1 wherein the reaction mixture is heated from about 50 to about 200° C.

6. The process of claim 1 wherein the acid is selected from the group consisting of hydrochloric acid, acetic acid, or sulfuric acid.

7. The process of claim 1 comprising the heating of acetone from about 50° to 200° C. in the conjoint presence of catalytic amounts of hydrochloric acid and an aprotic solvent.

8. The process of claim 7 wherein the aprotic solvent is N-methyl-pyrrolidone.

9. The process of claim 7 wherein the amount of aprotic solvent is three to four times in excess of the hydrochloric acid.

References Cited

UNITED STATES PATENTS

| | | | |
|---|---|---|---|
| 2,425,096 | 8/1947 | Ipatieff et al. | 260—668 |
| 3,267,165 | 8/1966 | Kimble et al. | 260—668 |

DELBERT E. GANTZ, *Primary Examiner.*

C. R. DAVIS, *Assistant Examiner.*

UNITED STATES PATENT OFFICE
CERTIFICATE OF CORRECTION

Patent No. 3,413,372   November 26, 1968

Edward Hurley, Jr.

It is certified that error appears in the above identified patent and that said Letters Patent are hereby corrected as shown below:

Column 2, line 11, "$CH_2$" should read -- $CH_3$ --.

Signed and sealed this 17th day of March 1970.

(SEAL)
Attest:

Edward M. Fletcher, Jr.  WILLIAM E. SCHUYLER, JR.
Attesting Officer  Commissioner of Patents